(12) United States Patent
Smith

(10) Patent No.: US 7,709,989 B2
(45) Date of Patent: May 4, 2010

(54) BRUSHLESS, WINDINGLESS ROTOR, VARIABLE RELUCTANCE, ELECTROMECHANICAL MACHINES, HAVING WOUND-FIELD EXCITATION

(76) Inventor: Larry Llewellyn Smith, 1015 Smith Rd., Xenia, OH (US) 45385

( * ) Notice: Subject to any disclaimer, the term of this patent is extended or adjusted under 35 U.S.C. 154(b) by 207 days.

(21) Appl. No.: 11/985,232

(22) Filed: Nov. 14, 2007

(65) Prior Publication Data
US 2009/0121583 A1  May 14, 2009

(51) Int. Cl.
*H02K 1/00* (2006.01)
(52) U.S. Cl. ............... 310/166; 310/168; 310/216.074; 310/216.075
(58) Field of Classification Search ............... 310/166, 310/168, 180, 184, 185, 216.074–216.075, 310/216.091
See application file for complete search history.

(56) References Cited

U.S. PATENT DOCUMENTS

| | | | | |
|---|---|---|---|---|
| 5,146,127 A | * | 9/1992 | Smith | 310/166 |
| 5,148,090 A | * | 9/1992 | Oku et al. | 318/107 |
| 5,272,401 A | * | 12/1993 | Lin | 310/49.51 |
| 5,739,620 A | * | 4/1998 | Wu et al. | 310/216.092 |
| 6,051,904 A | * | 4/2000 | Akemakou | 310/171 |
| 6,072,260 A | * | 6/2000 | Randall | 310/216.092 |
| 7,015,615 B2 | * | 3/2006 | Ramu et al. | 310/168 |
| 7,420,308 B2 | * | 9/2008 | Ramu et al. | 310/187 |
| 7,579,734 B2 | * | 8/2009 | Ramu et al. | 310/168 |

* cited by examiner

*Primary Examiner*—Tran N Nguyen (57) ABSTRACT

A combination of a unique construction format, involving two sets of rotor and stator embodiments, working in cooperation with each other, in a unique fixed, direct-axis and quadrature-axis orientation, and with unique field-winding, back-EMF cancellation, connection schemes to substantially negate the field-winding harmonic currents in the field-winding excitation circuits, and provide for a substantially square-wave shaped, open-terminal, armature output-voltage characteristic.

2 Claims, 10 Drawing Sheets

BRUSHLESS, WINDINGLESS ROTOR, VARIABLE RELUCTANCE, ELECTROMECHANICAL MACHINES, HAVING WOUND-FIELD EXCITATION

BACKGROUND OF THE INVENTION

1. Field of the Invention

This invention is related to the field of art of the brushless, windingless rotor, variable reluctance, electromechanical alternators and motors having wound-field excitation.

2. Background Information and Prior Art

The invention disclosed herein represents a significant improvement to, and an addition of new matter to the subject matter of the U.S. Pat. No. 5,146,127 to Smith, in the context of an inventive combination. The improvement by the inventive combination and the new matter disclosed are primarily focused on the potential applications of the technologies of the referenced Smith patent, in the areas of direct-current alternator products, single-phase and three-phase power alternators having alternating-current (AC), field-modulated excitation, as well as, electronically commutated (EC), direct-current, controlled drive motor products.

The disclosure by the U.S. Pat. No. 5,146,127 to Smith did not provide for a means, nor method, to substantially negate the undesirable harmonics in the currents of the field excitation circuits, that are the result of the back electromotive force, or back-EMF, generated in the field windings by the varying magnetic field pole fluxes. This field current harmonic condition results in undesirable harmonic distortion in the induced armature, open-terminal, output voltage waveform. Furthermore, the harmonics in the field currents and the armature, open-terminal, output voltage, interactively reduce machine efficiency; reduce the quality of the armature output-voltage waveform from the desired square-wave form, and introduce undesirable operational torque characteristics.

The means and methods disclosed herein, which consist of a combination of (1) a unique construction format for the rotor and stator embodiments, and (2) the connection schemes for the field windings, whereas, the combination is essential to substantially negate the aggregate back EMF of the field windings, to minimize the harmonic content of the field excitation currents, were not considered in the disclosure by Smith.

In addition to the unique construction format and the unique connection schemes for the field excitation windings, which are disclosed in the inventive combination, there is still another significant improvement disclosed herein that would add new matter to the disclosure in U.S. Pat. No. 5,146,127 to Smith. That is, the aggregate inductance of the field excitation windings and circuits would be substantially constant in magnitude; complementing the efforts to reduce the harmonics in the currents and EMF waveforms in both the field windings and armature windings circuitry.

BRIEF SUMMARY OF THE INVENTION

Accordingly, one of the primary objectives of this invention and disclosure is to provide for brushless, windingless rotor, variable reluctance, electromechanical alternators with wound-field excitation; which are uniquely constructed to provide for an optimized, open-terminal, armature output EMF waveform that has substantially an alternating square wave characteristic.

Another primary objective of this invention and disclosure is to provide for brushless, windingless rotor, variable reluctance, electromechanical alternators with wound-field excitation; which are uniquely constructed to provide for an excitation field current that can be optimized or maximized for the direct current component of harmonic content.

Still another primary objective of this invention and disclosure is to provide for brushless, electronically commutated, windingless rotor, variable reluctance, electromechanical motors with wound-field excitation; which are uniquely constructed to optimize the direct-current component of the field control currents and armature output EMF waveform characteristic for optimal performance of operation.

A more detailed primary objective of this invention and disclosure is to provide unique alternator and motor construction formats by means of a set of stator and rotor embodiments fixed in a quadrature-axis orientation, along with another set of stator and rotor embodiments fixed in a direct-axis orientation; working as a complementary combination on the same rotor shaft, in conjunction with unique field-winding connection schemes that use field-winding, back-EMF cancellation methods, to significantly reduce the harmonics in the field-winding excitation circuits, as well as, the associated harmonics that are generated in the armature windings as a result of the harmonic currents in the field windings.

BRIEF DESCRIPTION OF THE SEVERAL VIEWS OF THE DRAWING

Thus, having presented the above general summary of this invention and disclosure, the following drawing figures are provided to further aid in the understanding of the preferred embodiment disclosed herein.

DETAILED DESCRIPTION OF THE INVENTION

For the purpose of promoting an understanding of this invention and disclosure, references will be made to the embodiments illustrated in the drawings, as the preferred operational example. It is intended that no limitation of the scope of this invention is being implied by the preferred operational example used herein, with any alterations, modifications, or derivatives of the illustrated embodiments and any application of the principles, features, and methods or processes within the spirit of the present invention and disclosure, and as illustrated herein and being contemplated, as occur to one skilled in the art to which this invention relates.

Figure 3:
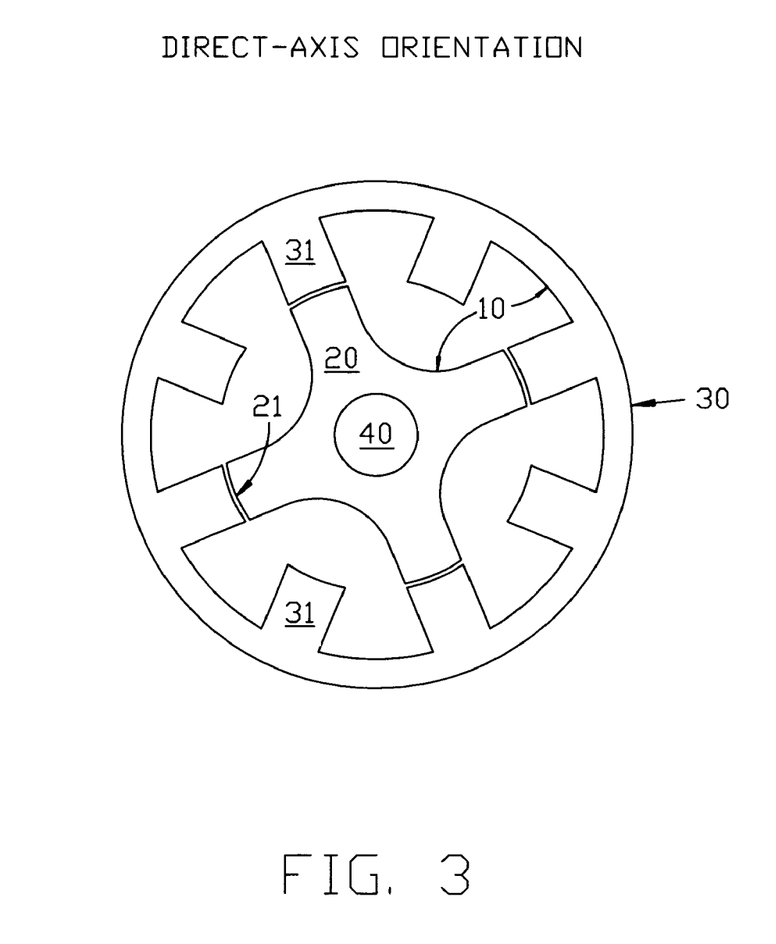
FIG. 3 illustrates the relative positions of the salient rotor poles and salient stator poles when the rotor-stator set is in the direct-axis orientation.
Figure 4:
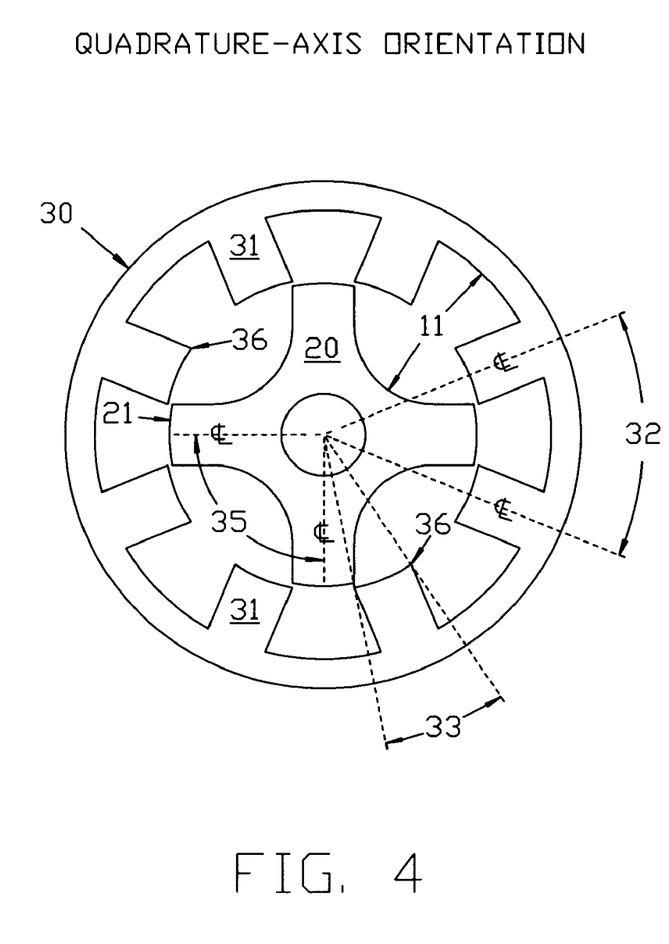
FIG. 4 illustrates the relative positions of the salient rotor poles and salient stator poles when the rotor-stator set is in the quadrature-axis orientation.

Accordingly, with reference to FIG. 3 and FIG. 4, there is illustrated in each drawing a set of stator 30 and rotor 20 embodiments, herein, referred to as laminations, lamination embodiments, lamination sets, or lamination stacks, for the four-pole machine that will be referred to throughout this description as an operational example. The illustration in FIG. 3 displays a stator 30 lamination pattern as well as the rotor 20 lamination pattern. An assembled machine will typically involve a stack of each type of the illustrated stator 30 and rotor 20 laminations. In FIG. 3 a set 10 of stator 30 and rotor 20 laminations are displayed in a direct-axis orientation. The scheme illustrated in FIG. 4 displays a set 11 of stator 30 and rotor 20 laminations in a quadrature-axis orientation. The two stator 30 and rotor 20 lamination sets, 10 and 11, of FIG. 3 and FIG. 4 must each maintain this special orientation when final assembly is complete. That is, one set 10 of stator 30 and rotor 20 laminations has to be in a direct-axis orientation when the other set 11 of stator 30 and rotor 20 laminations is in quadrature-axis orientation, and must maintain this angular association as the rotor shaft 40, with the two rotor 20 lamination embodiments affixed, rotates within the machine. The general design patterns and scheme of the stator 30 laminations and the rotor 20 laminations in FIG. 3 and FIG. 4 are such that the salient stator poles 31, herein referred to as salient stator poles, or stator poles, number in multiples of four; have even angular centerline spacing 32 around the stator 30 laminations, and are substantially equal in angular pole width 33. The angular spacing 34 between the tips 36 of the stator poles 31 is substantially equal to the angular pole width 33. Where as, the salient rotor poles 21, herein referred to as salient rotor poles, or rotor poles, number one-half the number of stator poles 31 and have substantially the same angular pole width 33 as the stator poles 31. The rotor poles 21 have an evenly spaced angular displacement 35 about the rotor 20 lamination embodiment.

A set 10 of stator 30 and rotor 20 laminations in FIG. 3 are assembled with a common rotor shaft 40, along with a set 11 of stator 30 and rotor 20 laminations of FIG. 4. The rotor shaft 40 is typically made with a non-magnetic material.

Figure 1:
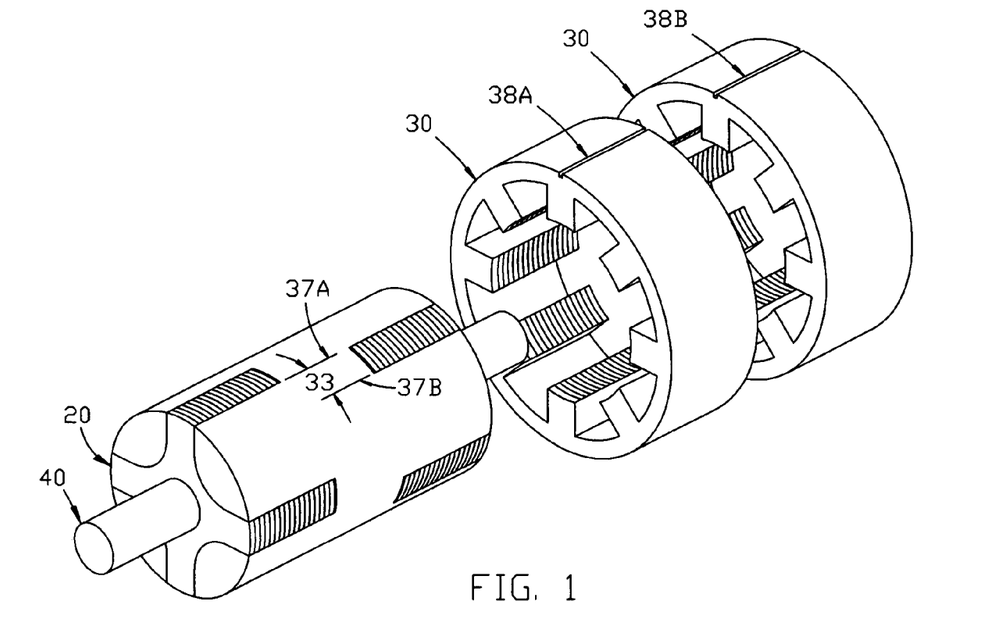
FIG. 1 is a view of the rotor and stator embodiments of the preferred operational example, which illustrates one method to provide the direct-axis and quadrature-axis effect in the polyphase machine, by using a rotational (angular) shift in one of the rotor lamination embodiments.
Figure 2:
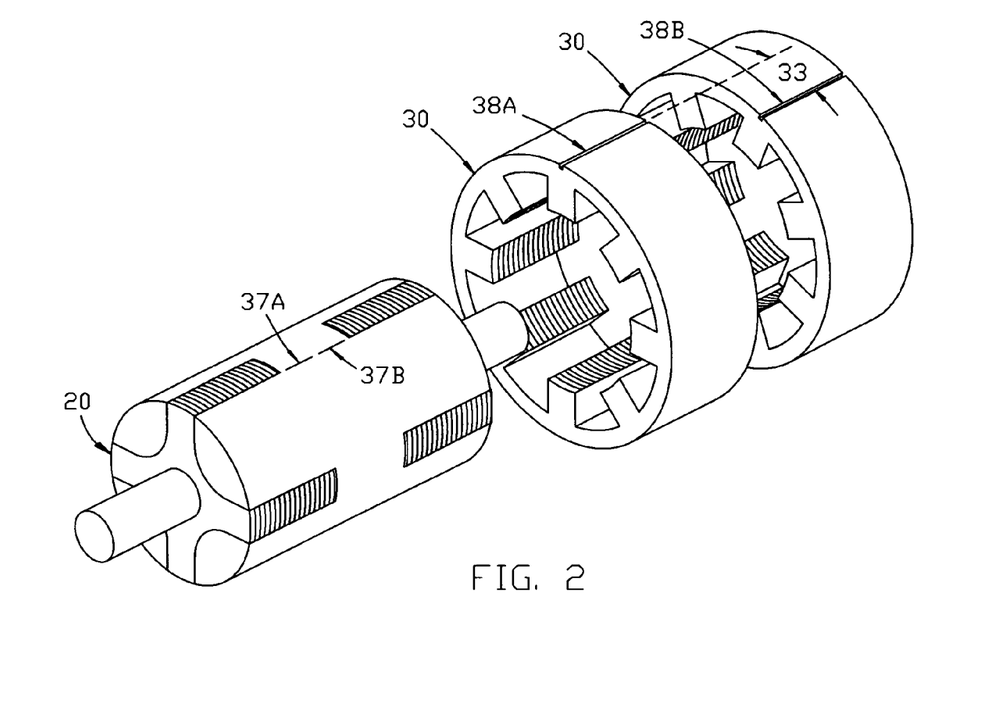
FIG. 2 is a view of the rotor and stator embodiments of the preferred operational example, which illustrates an alternative method to provide the direct-axis and quadrature-axis effect in the polyphase machine, by using a rotational (angular) shift in one of the stator lamination embodiments.

FIG. 1 and FIG. 2 are provided to illustrate one of the principle construction requirements, which involves the direct-axis and quadrature-axis orientations and fixation of the rotor shaft 40, relative to the stator 30 and rotor 20 lamination sets, in assembling the polyphase machine illustrated for the operational example. The perspectives illustrated in FIG. 1 and FIG. 2 display details that enable visualization of the effect that, as the rotor turns, when one stator 30 and rotor 20 lamination set is in a direct-axis orientation, the other stator 30 and rotor 20 set would be in a quadrature-axis orientation FIG. 1 and FIG. 2 are also illustrating a few construction methods that can be used to achieve the direct-axis and quadrature-axis relationships in the polyphase machine by using (1) the rotor 20 lamination sets with fixed references 37A and 37B, as shown in FIG. 1, and shifting the stator 30 lamination set by one pole width 33, or by (2) using the stator 30 lamination sets with fixed references 38A and 38B, as illustrated in FIG. 2, and shifting the rotor 20 lamination set by one pole width 33.

Figure 5:
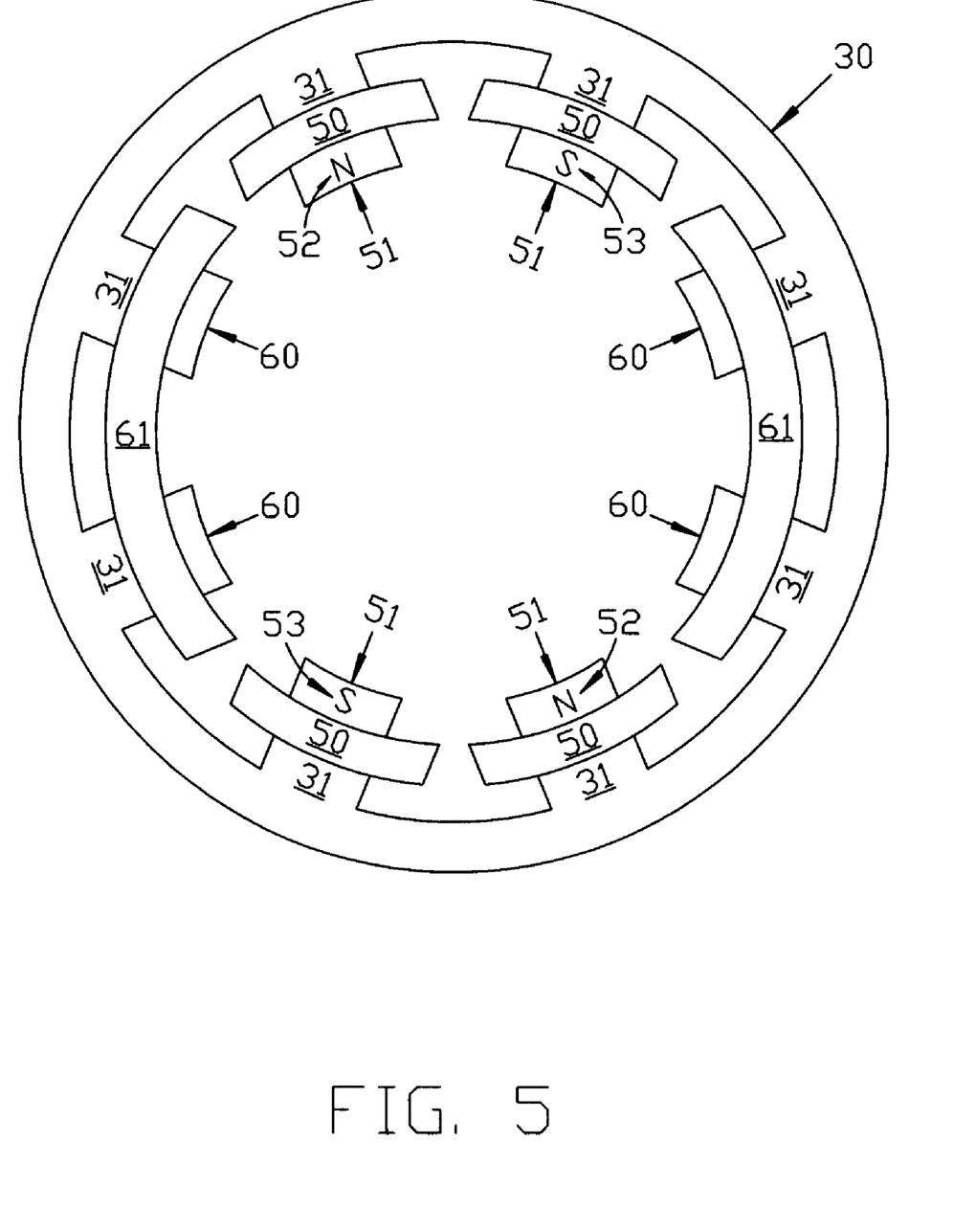
FIG. 5 shows the pattern of locations for the field excitation windings and the armature windings, as located on the stator lamination embodiment. Also, shown is the pattern of the magnetic polarities of the field salient poles that are created by the field excitation currents in the field windings.

As illustrated in FIG. 5, the field windings 50, herein referred to as field-winding, field windings, field winding coils, or field excitation windings, are typically mounted on the field poles, or field magnetic poles 51, that are located on the stator 30 embodiments to provide for the magnetic field or field excitation pole polarities of magnetic north (N) 52 and magnetic south (S) 53. Also, illustrated in FIG. 5 are armature windings 61 mounted on the armature poles, or armature magnetic poles 60, as described in the previous art by Smith. The armature windings are typically mounted as a single unit or grouping around both the two adjacent armature poles, with the alternative being to wind each armature pole individually and then connect the two armature windings in series.

Now to complete the disclosure of the inventive combination that significantly enhances the synergy of the assembled embodiments, consisting of two sets 10 and 11 of stator 30 and rotor 20 laminated embodiments of FIG. 3 and FIG. 4, fixed in a unique relative angular relationship of direct-axis and quadrature-axis orientation, the connection scheme of the field excitation windings 50 will be disclosed, herein.

A significant enhancement in the synergy is to be gained by using a special and basically unique connection scheme of the field windings 50, in combination with the geometrically unique structure of the combined sets, 10 and 11, of stator 30 and rotor 20 lamination embodiments, as described in the present disclosure.

Figure 6A:
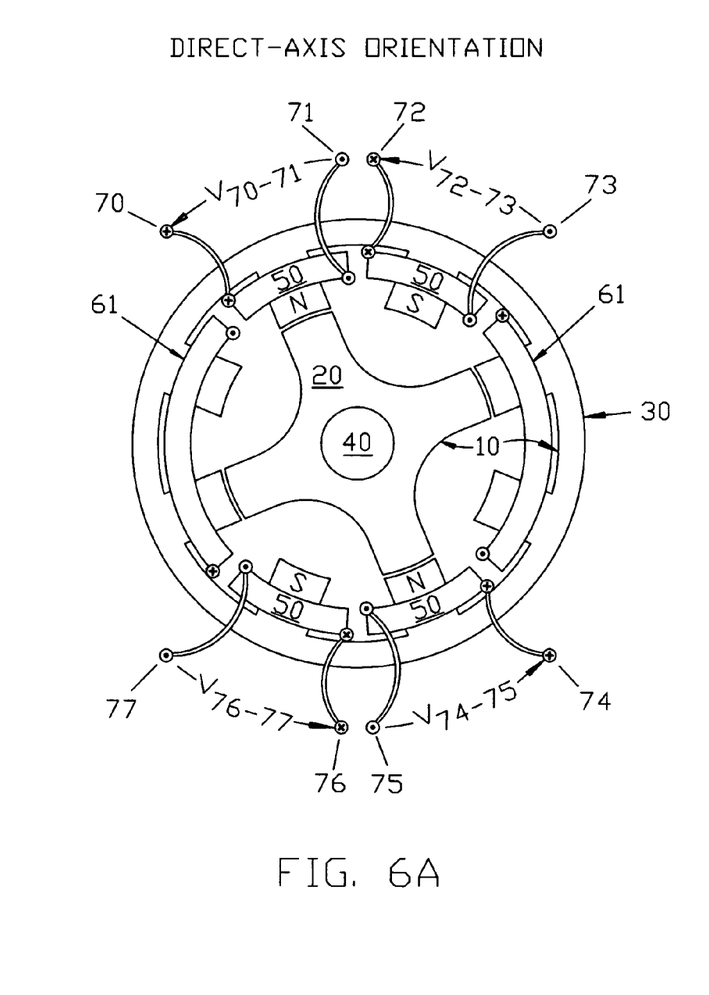
FIG. 6 provides the labeling and nomenclature for the back-EMF generated by the field excitation windings, so that management of the winding polarities will result in the desired connection schemes.
Figure 6B:
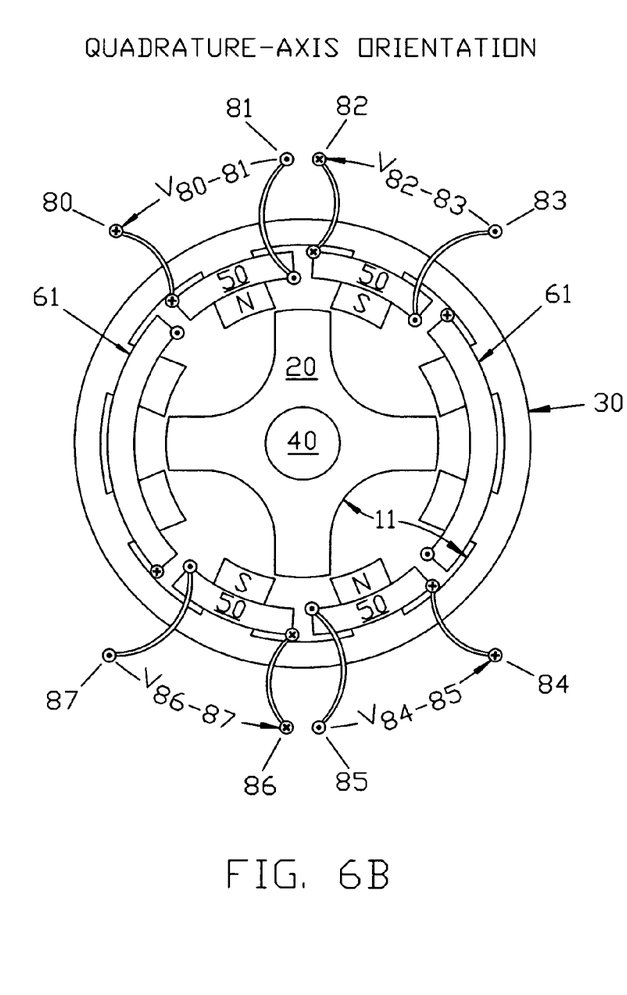
Figure 10A:
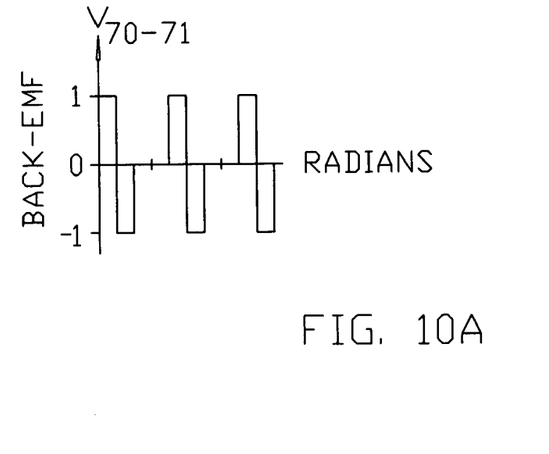
FIG. 10A is a plot which illustrates a representative wave form and polarity of the back-EMF generated by the field winding having the indicated coil terminal numerals in the subject plot. Also, shown is a brief plot indicating the scale units of all the plots in FIG. 10, FIG. 11, and FIG. 12. as the normalized (or, per unit) values of the back-EMF quantities versus the (rotational) radians of rotor movement.
Figure 10B:
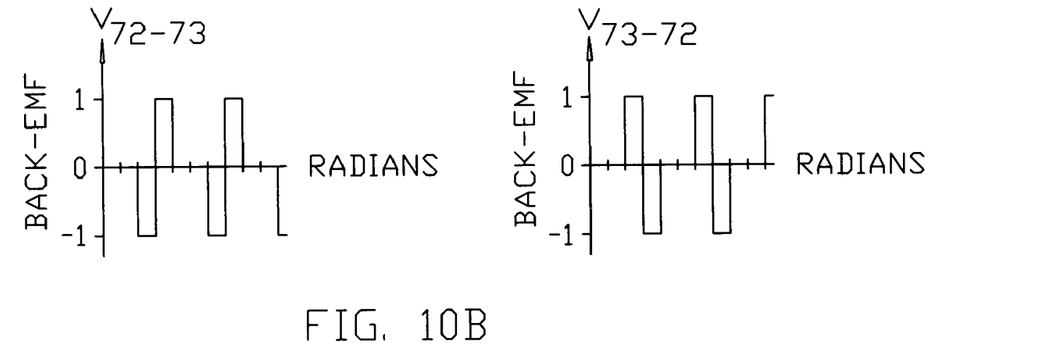
FIG. 10B illustrates plots of representative wave forms of both opposing vectorial polarities of the back-EMF generated by the field winding as identified by the indicated coil terminal numerals.
Figure 10C:
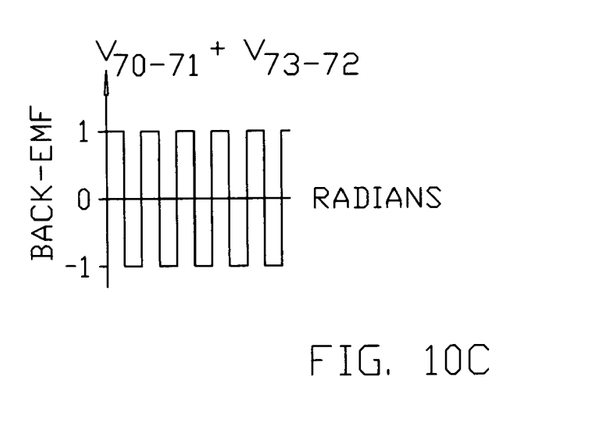
FIG. 10C is a plot which illustrates a representative wave form and polarity of the aggregate (vectorial) sum of the back-EMF's generated by the two field coils as identified by the indicated field coil terminal numerals, shown in the connection scheme of FIG. 9.
Figure 11A:
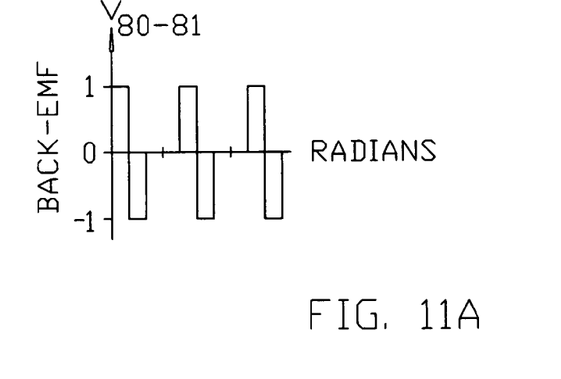
FIG. 11A illustrates a representative wave form and polarity of the back-EMF generated by the field winding having the indicated field coil terminal numerals.
Figure 11B:
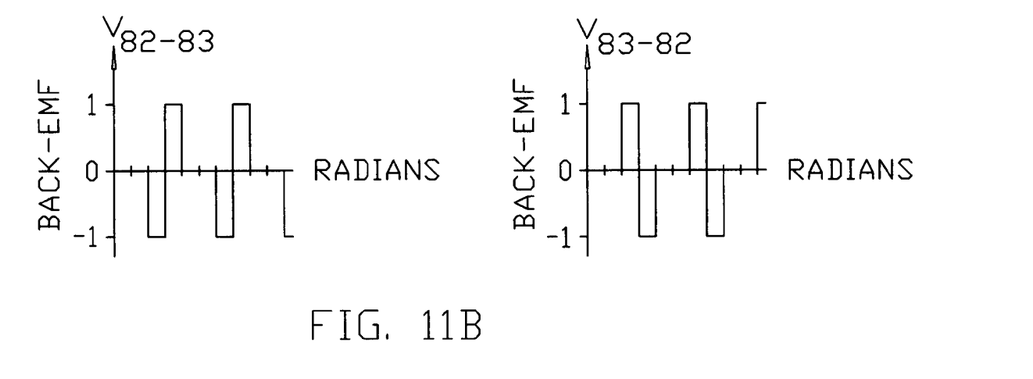
FIG. 11B illustrates plots of representative wave forms and both opposing (vectorial) polarities of the back-EMF generated by the field winding as identified by the indicated field coil terminal numerals.
Figure 11C:
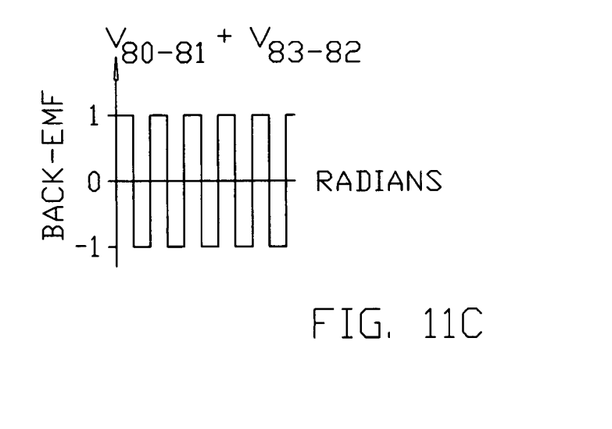
FIG. 11C is a plot which illustrates a representative wave form and polarity of the aggregate (vectorial) sum of the back-EMF's generated by the two field windings as identified by the indicated field coil terminal numerals, shown in the connection scheme of FIG. 9.
Figure 12A:
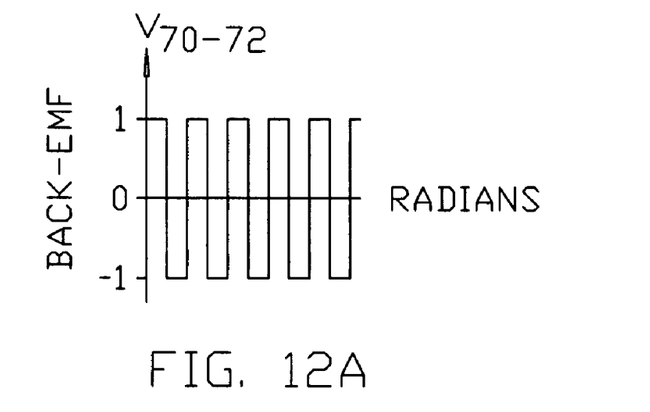
FIG. 12A is a plot which illustrates a representative wave form and polarity of the aggregate (vectorial) sum of the back-EMF's generated by the two field windings as identified by the field coil terminal numerals, shown in the connection scheme of FIG. 9.
Figure 12B:
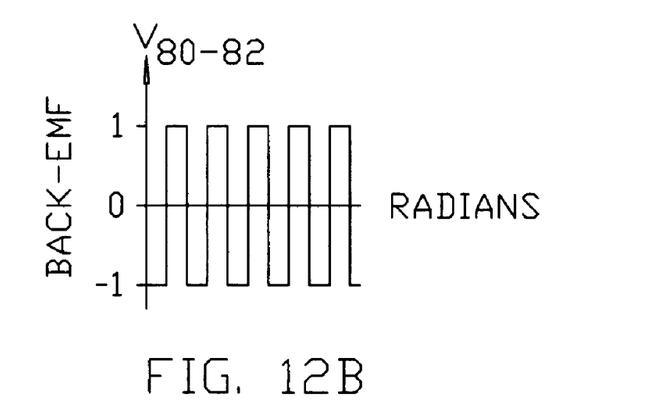
FIG. 12B is a plot which illustrates a representative wave form and polarity of the aggregate (vectorial) sum of the back-EMF's generated by the two field windings as identified by the field coil terminal numerals, shown in the connection scheme of FIG. 9.
Figure 12C:
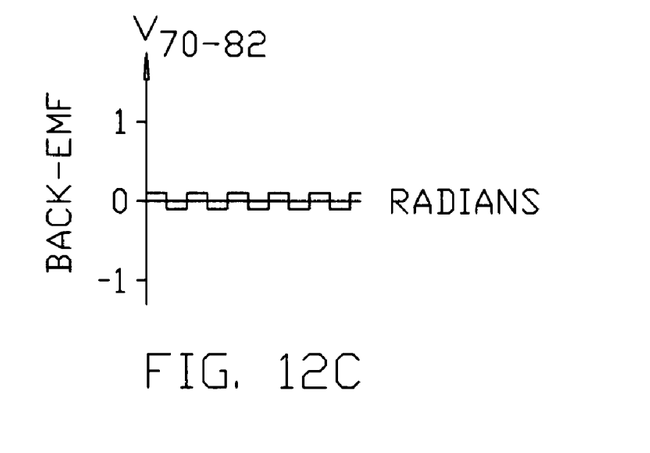
FIG. 12C is a plot which illustrates a representative wave form of the aggregate (vectorial) sum of the back-EMF's generated by the four field windings as identified by the field coil terminal numerals, shown in the connection scheme of FIG. 9 as the completing steps to provide for the back-EMF cancellation objective.

Therefore, as illustrated in FIG. 6A and FIG. 6B, there is a group of stator 30 and rotor 20 laminated embodiments, consisting of two lamination sets 10 and 11 of stator 30 and rotor 20 embodiments. The stator 30 and rotor 20 lamination set 10 is illustrated in FIG. 6A with four field excitation windings 50; having numeric labeling of their terminals as 70 and 71, 72 and 73, 74 and 75, 76 and 77 on the direct-axis lamination set 10, so that reference can be made to voltages and back-EMF's associated with each of the field windings 50. For the operational example, herein described, all of the field windings 50 are wound identically and placed on the stator field poles 51 in the same orientation and having the winding direction in order to manage the polarities of their back-EMF and the polarity of the field winding 50 coils as they are connected together. The polarities of the magnetic poles 52 and 53, as illustrated in FIG. 5, and the polarities of the field winding coils 50 are governed by the common "cross-dot" and "right-hand rule" conventions. The stator 30 and rotor 20 lamination set 11 is illustrated in FIG. 6B with four field excitation windings 50; having numeric labeling of their terminals as 80 and 81, 82 and 83, 84 and 85, 86 and 87 on the quadrature-axis lamination set 11. Also, the characteristic plots of the field winding terminal voltages (or back-EMF's) versus rotational radians of the rotor are illustrated in FIG. 10, FIG. 11, and FIG. 12 to better convey an understanding of the working machine and the field winding 50 connection schemes and characteristics, using the above terminal labels 70, 71, 72, 73, etc.

Accordingly, with reference to FIG. 6A, the field winding 50 with its terminals labeled 70 and 71, on the direct-axis lamination set 10, is shown to have a representative back-EMF of $V_{70-71}$, and the field winding 50 with its terminals labeled 72 and 73 having a representative back-EMF of $V_{72-73}$. Also, on the direct-axis lamination set 10, is the field winding 50 with its terminals labeled 74 and 75 and having a representative back-EMF of $V_{74-75}$, and a field winding 50 with its terminals labeled 76 and 77 and having a representative back-EMF of $V_{76-77}$.

Similarly, in FIG. 6B the field winding 50 with its terminals labeled 80 and 81, on the quadrature-axis lamination set 11, is illustrated to have a representative back-EMF of $V_{80-81}$, and the field winding 50 with its terminals labeled 82 and 83 is shown to have a representative back-EMF of $V_{82-83}$. Also, illustrated on the quadrature-axis lamination set 11, is a field excitation winding 50 with its terminal labels 84 and 85 and having a representative back-EMF of $V_{84-85}$, and another field winding 50 with its terminals labeled 86 and 87 and having a representative back-EMF of $V_{86-87}$. Further more, for example purposes, the standard nomenclature used herein is intended to be that the voltage $V_{70-71}$ represents the voltage at terminal 70 with respect to terminal 71, and likewise, the voltage $V_{71-70}$ represents the voltage at terminal 71 with respect to terminal 70.

Figure 7:
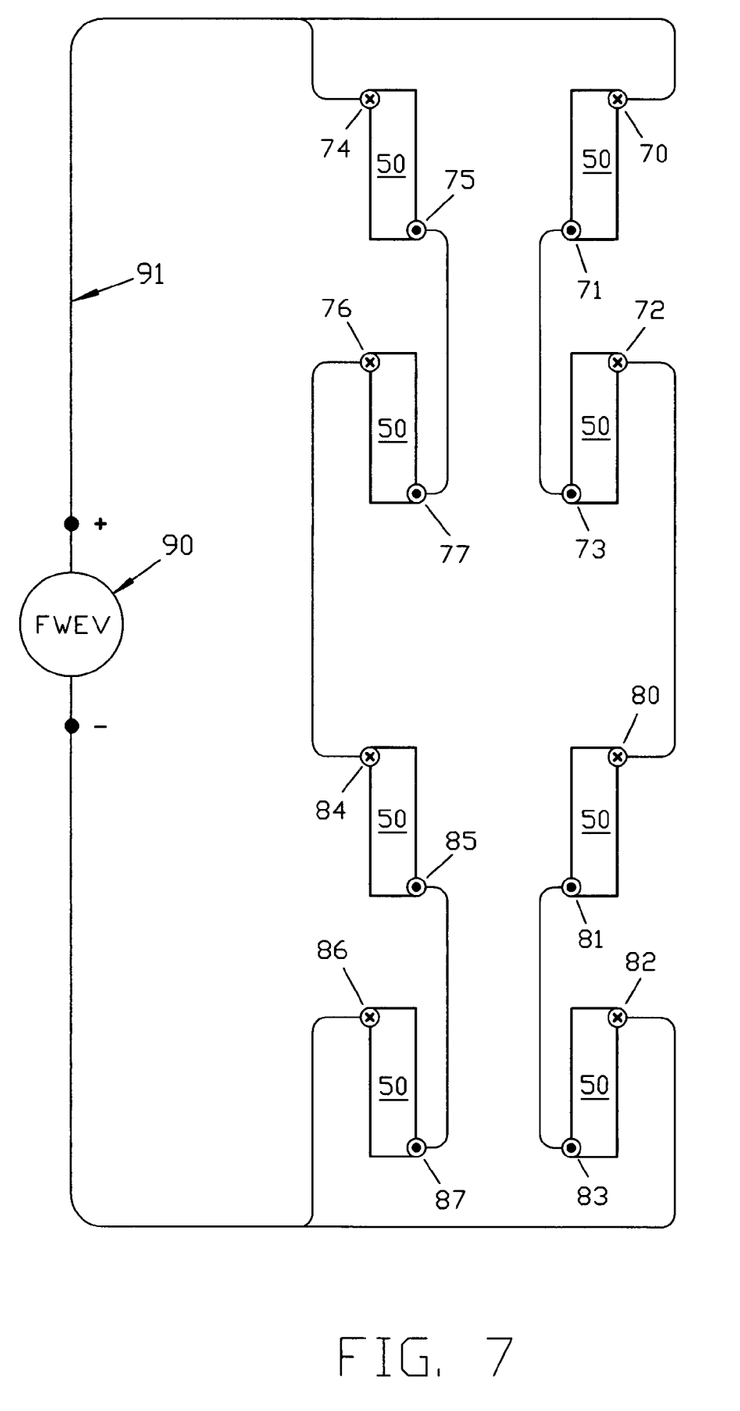
FIG. 7 illustrates the preferred connection scheme of the field excitation windings of the preferred operational example, which will provide the objective of producing field winding, back-EMF cancellation in the field excitation circuit.
Figure 8:
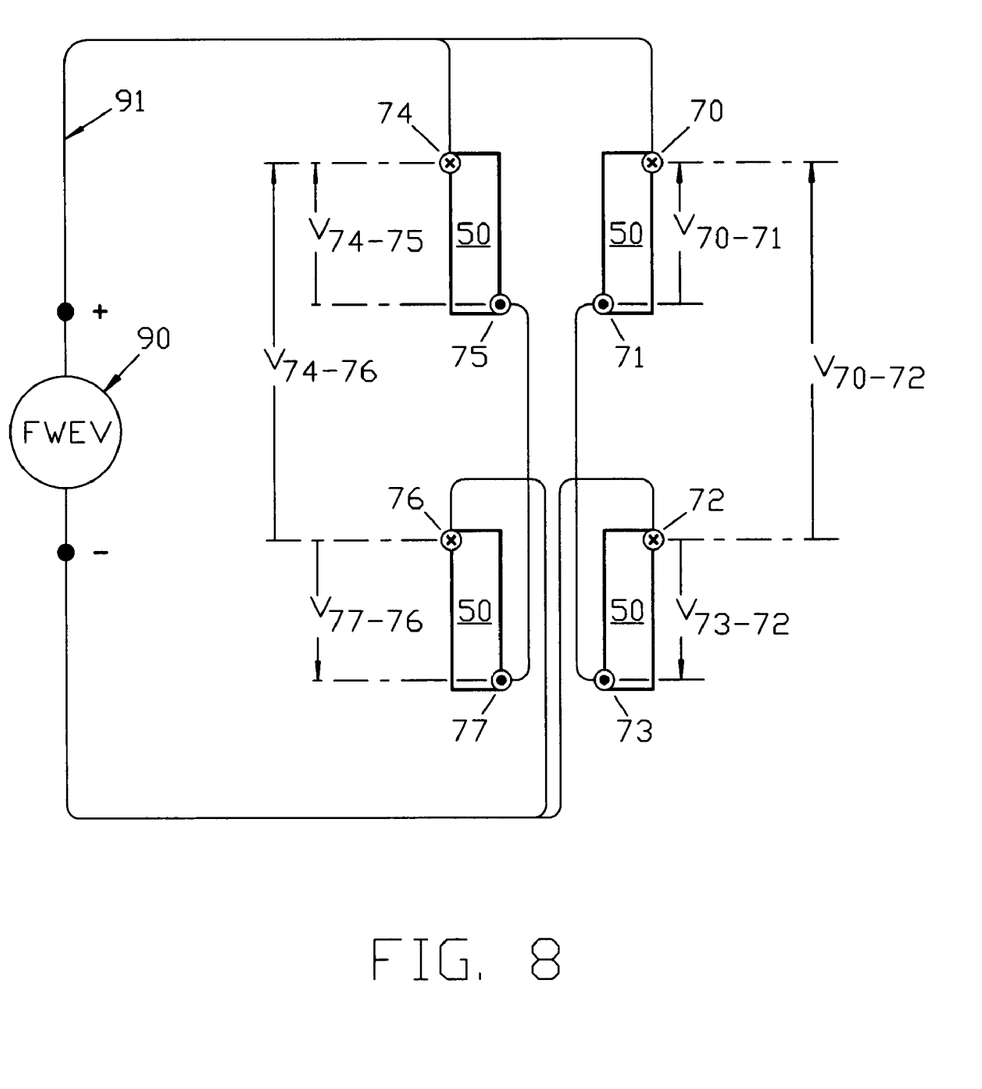
FIG. 8 illustrates the preferred connection scheme of the field excitation windings for the previous art, which did not provide for methods of field winding, back-EMF cancellation in the field excitation circuit.
Figure 9:
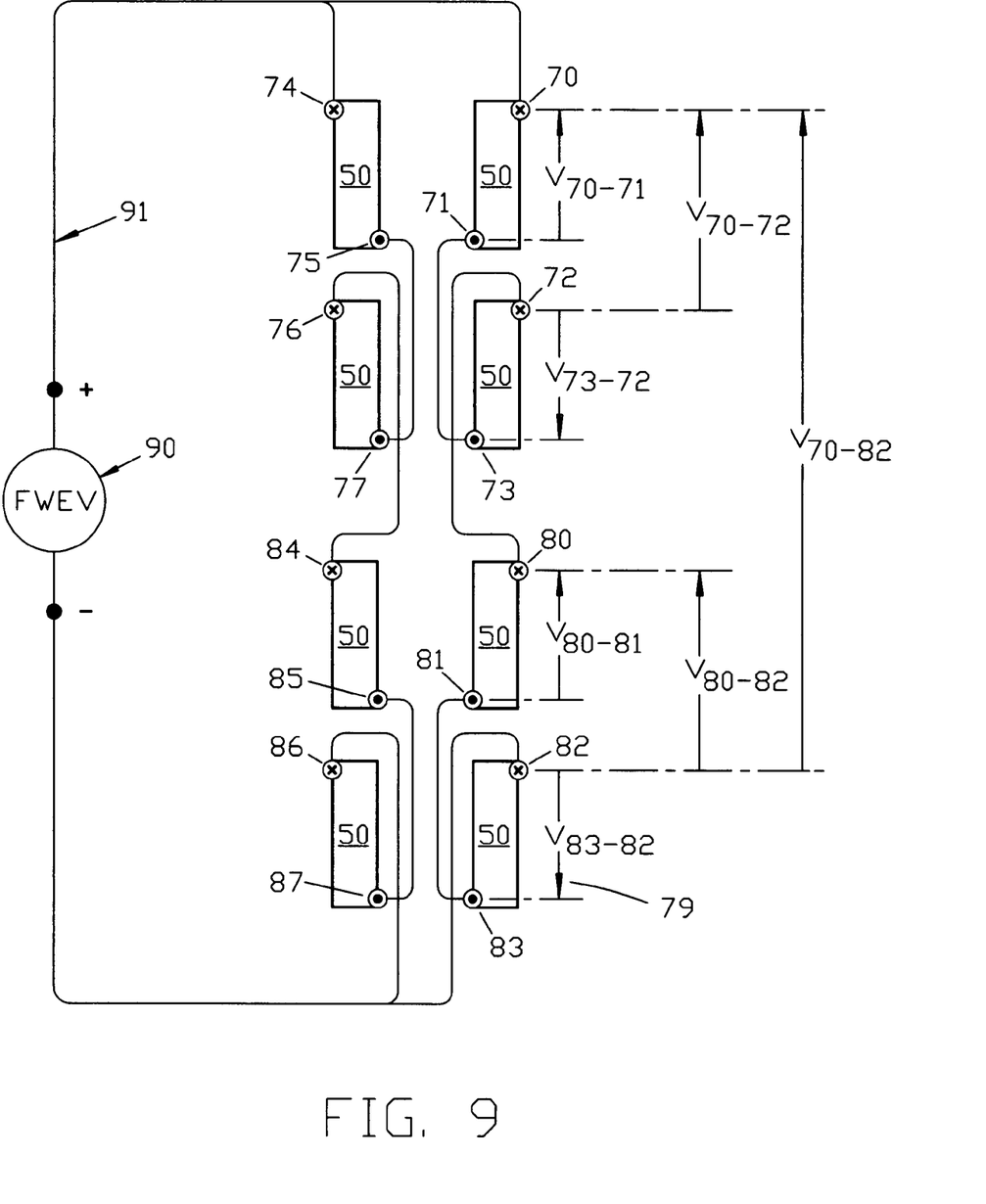
FIG. 9 provides vectorial polarity nomenclature to the back-EMF quantities of the field excitation windings, as an aid to properly connect these windings to achieve one of the primary objectives of field winding, back-EMF cancellation in the field excitation circuit.

As the assembly of the machine progresses, the field windings 50 are connected using the scheme in FIG. 7. The primary principle in all the connection schemes for the field winding coils 50 is to effect an overall objective of using the back-EMF of each of the field windings 50 to achieve a back-EMF cancellation scheme, which substantially negates or minimizes the aggregate back-EMF being generated by the field winding coils 50. In addition, FIG. 9 displays one of the preferred connection schemes for the field windings 50, as well as the back-EMF voltages with example vector polarities 79 illustrated for some of the field winding coils 50. This is the effect that is being illustrated in FIG. 12A, FIG. 12B and FIG. 12C, and specifically the aggregate back-EMF $V_{70-82}$, which is illustrated by the graphical plot in FIG. 12C. The aggregate sum (or, aggregate vectorial sum) of the back-EMF's comprising $V_{70-82}$ has an effect on the field winding, excitation voltage source (FWEV) 90, consistent with an opposing voltage source in the field excitation circuit 91, and as one that would present an undesirable harmonic voltage, as illustrated in FIG. 12A and FIG. 12B, in the context of an opposing, relatively high back-EMF source. FIG. 8 is shown to illustrate the preferred scheme of connecting the field excitation windings in the previous art. The connection scheme in FIG. 8 would result in a relatively high harmonic-producing back-EMF voltage source in the field winding excitation circuit 91.

I claim:

1. In combination, a brushless, windingless rotor, variable reluctance, electromechanical machine, having wound-field excitation; said machine comprising:

(a) a stator means for magnetic flux paths that provide for operational magnetic circuits; wherein said stator means having a stator assembly inclusive of operational, salient stator magnetic poles extending radially from said stator means; said stator salient poles being disposed for use as armature poles and field poles; said salient stator poles being uniformly disposed about the stator assembly and totaling to a quantity that is a multiple of the number four (4); said salient stator poles having contoured surfaces and tips as the salient stator pole working air-gap surfaces that work in cooperation with salient rotor pole surfaces and tips to effect magnetically workable air-gaps; said salient stator poles consisting of armature poles and field poles disposed in a rotational orientation about the operational axis of said stator means, such that two armature poles are intermediate to two sets of two field poles, said two field poles in each said set of stator field poles, having a field excitation winding disposed with each said field pole; said field excitation windings operating in opposite magnetic polarity of each other in said set of field excitation windings, and both of said two armature poles are encompassed by one grouping of armature windings; said magnetic polarity of each said stator field pole in the stator field pole set, exhibiting a uniform sequence about the stator assembly;

(b) a rotor means for magnetic flux paths that provide for operational magnetic circuits; said rotor means being rotatably disposed with said stator means; said rotor means having a rotor assembly inclusive of a rotor shaft and laminated electromagnetic materials for magnetic flux paths that provide for operational magnetic circuits; said rotor laminated materials having uniformly spaced salient rotor poles about said rotor shaft; said salient rotor poles having a circumferential pole surface width that is substantially equal to the salient stator pole surface circumferential width; said salient rotor poles totaling to a quantity that is one-half (½) the number of said salient stator poles;

(c) said salient stator poles and said rotor salient poles having interdependent and complementary salient pole widths which are capable of providing a cooperative, magnetically working relationship with said surfaces of the operational magnetic poles in forming the magnetically workable air-gap, wherein the mathematical reciprocal of the air-gap reluctance, between a salient stator pole and a salient rotor pole, decreases in magnitude as the rotor pole is moved from a direct-axis orientation to a quadrature-axis orientation;

wherein an improvement comprises:

said machine having one or more groupings of said stator and said rotor assemblies disposed with a rotor shaft; said one or more groupings consisting of two sets of said stator and said rotor assemblies; said two sets of said stator and said rotor assemblies disposed in said machine, such that both said sets of said stator and said rotor assemblies, within said one or more groupings work simultaneously in a rotational manner about said rotor axis in a predetermined and fixed, relative angular rotational displacement of a direct-axis and quadrature-axis relationship relative to each other; and working in conjunction with a predetermined improvement of back-electromotive force cancellation methods and connection schemes of the field-windings of said stator assemblies to substantially mitigate an aggregate back-electromotive force of the field-windings in the field-winding excitation circuit.

2. In combination, a brushless, windingless rotor, variable reluctance, electromechanical machines having wound-field excitation, said electromechanical machine comprises:

(a) a stator means for providing for stator magnetic flux circuits; said stator means having radially orientated salient stator magnetic poles extending from a stator assembly; said salient stator magnetic poles consisting of salient armature magnetic poles and salient field magnetic poles disposed in a rotational orientation about said stator means, such that each salient armature magnetic pole is intermediate to two said salient field magnetic poles; with a field excitation winding disposed with each said salient field magnetic pole, and an armature winding disposed on the salient armature magnetic poles; and (b) a rotor means for providing magnetic flux circuits; said rotor means being rotatably disposed with said stator means; said rotor means having rotor elements uniformly disposed on said rotor means, said rotor elements being constructed of material that has a permeability substantially greater than that of free space; and said rotor elements being separated and supported by material having a permeability which approximates that of free space; and said rotor elements having an axial orientation; and said rotor elements having two salient magnetic poles and being magnetically passive;

wherein an improvement comprises:

said machine having one or more groupings of said stator and said rotor assemblies disposed with a rotor shaft; said one or more groupings consisting of two sets of said stator and said rotor assemblies; said two sets of said stator and said rotor assemblies disposed in said machine, such that both said sets of said stator and said rotor assemblies within said one or more groupings work simultaneously in a rotational manner about said rotor axis in a predetermined and fixed, relative angular rotational displacement of a direct-axis and quadrature-axis relationship relative to each other; and working in conjunction with a predetermined improvement of back-electromotive force cancellation methods and connection schemes of the field-windings of said stator assemblies to substantially mitigate an aggregate back-electromotive force of the field-windings in the field-winding excitation circuit.

* * * * *